Sept. 15, 1953 R. O. BILLINGS 2,652,280
GRAPPLE
Filed April 11, 1949 2 Sheets-Sheet 1
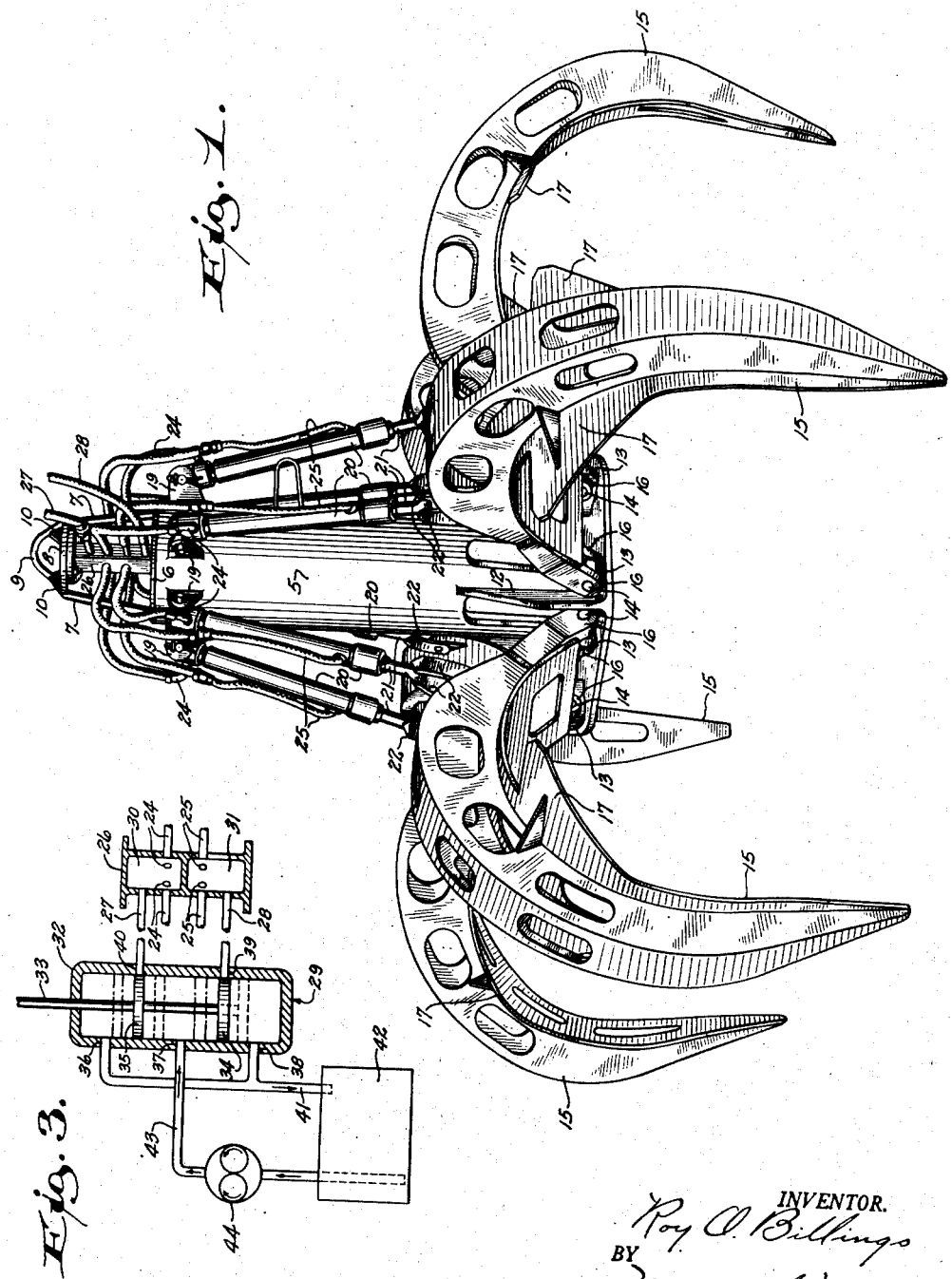
INVENTOR.
Roy O. Billings
BY
Morsell & Morsell
ATTORNEYS.

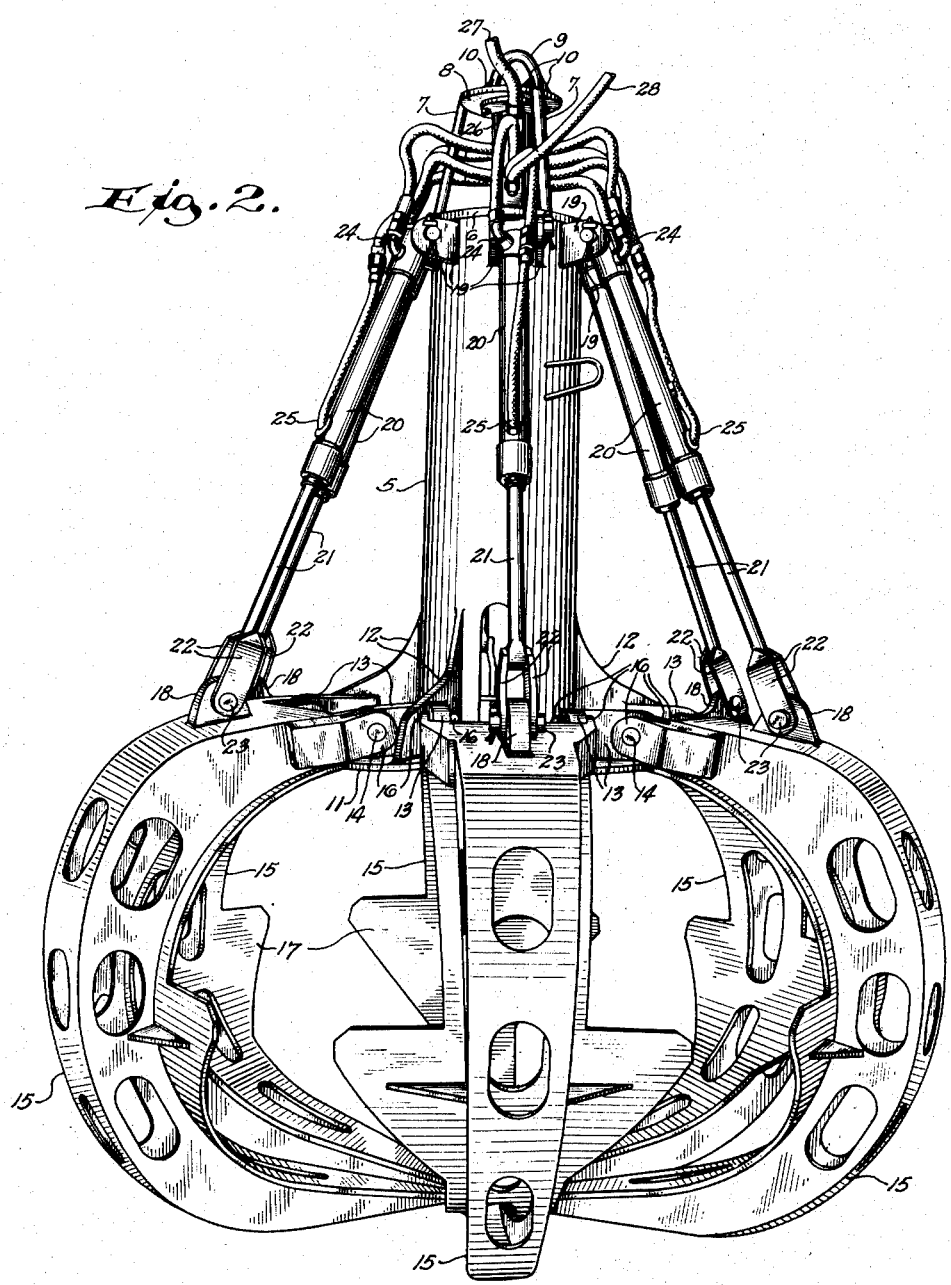

Patented Sept. 15, 1953

2,652,280

UNITED STATES PATENT OFFICE 2,652,280

GRAPPLE

Roy O. Billings, Milwaukee, Wis.

Application April 11, 1949, Serial No. 86,689

7 Claims. (Cl. 294—88)

This invention relates to improvements in grapples and more particularly to hydraulically operated grapples having a plurality of radially disposed tines.

In handling bulk material, such as block wood or the like, conventional cable operated grapples have not been entirely satisfactory. This is due to the fact that in a cable operated grapple all of the tines must be moved simultaneously substantially the same distance, and none of the tines can move independently of the others to compensate for irregularities in the mass being handled. In addition, in cable operated grapples, the amount of force which the tines can exert when moving toward closed position is restricted to that force which is derived from gravity.

It is, therefore, a general object of the present invention to provide an improved grapple wherein the tines are hydraulically actuated and are capable of independent movement.

A further object of the invention is to provide an improved grapple having a plurality of radially disposed hingedly mounted tines, each of which is actuated by an individual hydraulic ram.

A further object of the invention is to provide an improved grapple of the class described wherein the hydraulic rams for actuating the tines are connected to a common source of hydraulic pressure so that when the tines are moved downwardly and inwardly toward closed position during a grappling operation, each tine will engage the material being handled with the same amount of inward pressure regardless of the amount of tine movement necessary for this to be accomplished. Thus, means is provided to compensate for irregularities in the mass which is being engaged by said tines and the efficiency of the grapple is increased.

A further object of the invention is to provide an improved grapple of the class described which is strong and durable, which is efficient in operation, which is relatively simple in construction, and which is otherwise well adapted for the purposes described.

With the above and other objects in view, the invention consists of the improved grapple, and all of its parts and combinations, as set forth in the claims, and all equivalents thereof.

In the drawings accompanying and forming a part of this specification wherein is shown one complete embodiment of the preferred form of the invention, and wherein the same reference characters indicate the same parts in all of the views:

Fig. 1 is a side view of the improved grapple showing the tines thereof in open position;

Fig. 2 is a view similar to Fig. 1 showing the tines in closed position; and

Fig. 3 is a fragmentary diagrammatic view of the hydraulic system.

Referring more particularly to the drawings, the numeral 5 indicates a vertically extending tubular frame member of steel or other suitable material. Fixed to the upper end of the member 5, as by welding, is a circular top plate 6. Preferably three equally spaced supporting legs 7 are welded to the top plate 6 adjacent the periphery thereof and extend upwardly and slightly inwardly. The legs 7 are welded at their upper ends to peripheral portions of a circular plate 8 which is spaced from and is parallel and coaxial with the top plate 6. Welded to the upper surface of the plate 8 is a hanger eye 9, formed of an inverted U-shaped rod member which is preferably provided with reinforcing gussets 10, the latter being also welded to the plate 8. The legs 7, plate 8 and eye 9 provide a supporting head by which the improved grapple may be suspended.

Fixed, as by welding, to the lower end of the frame member 5 is a plate 11. The latter may be of any suitable shape but is preferably substantially wider than the diameter of the frame member 5. Suitable reinforcing ribs or gussets 12 are preferably welded to the plate 11 and to the frame member 5.

Positioned symmetrically around the lower end of the frame member 5, and preferably fixed, as by welding, to the plate 11 and the gussets 12, are a plurality of pairs of spaced ears or lugs 13. The pairs of lugs 13 are preferably six in number, and each of said lugs is apertured. Pivotally connected to each pair of spaced lugs 13, as by the pins 14, is a grapple tine 15.

Each tine 15 is formed at each side of its upper end with a pair of spaced projecting ears or lugs 16. The lugs 16 are adapted to be positioned one on each side of a lug 13 when the tines are assembled on the frame member 5 as shown. When the tines are so assembled, they are each swingable in a vertical plane between the positions of Fig. 1 and Fig. 2. Each of the tines 15 preferably has the form of an arcuate box section which tapers to a point at its lower end. The inner wall of each tine 15 may be formed with spade-like extensions 17 to increase the capacity of the grapple assembly.

Fixed to an intermediate portion of the outer surface of each of the tines 15 is an apertured lug or ear 18 (see Fig. 2). Fixed to the upper end of the sidewall of the frame member 5 is a pair of spaced lugs or ears 19 for each one of the tines. One of the pairs of lugs 19 is vertically alined with each of the lugs 18 as shown.

Pivotally connected to each pair of the lugs 19 is one end of the casing or cylinder of a preferably double acting ram 20. The rams 20 depend from the lugs 19 and are provided with piston rods 21, the outer ends of which are pivotally connected to the lugs 18 through ears 22 formed on said rods and through the pins 23. The cylinders 20 are each provided with a fluid connection 24 at its upper end and with a fluid connection 25 at its lower end.

Referring to Fig. 3, it will be noted that the manifold 26 is formed with two separate chambers 30 and 31. The conduits 24 and the conduit 27 communicate with the chamber 30, and the conduits 25 and the conduit 28 communicate with the chamber 31. Any suitable control valve 29 may be used to control the hydraulic system of this invention, the control valve shown being merely illustrative. The valve 29 preferably has a cylindrical casing 32 and has a valve stem 33 slidably projecting through one end wall thereof. The stem 33 has formed thereon a pair of spaced discs 34 and 35. The valve casing 32 is formed with spaced ports 36, 37, 38, 39 and 40.

The conduit 27 communicates with the port 40 and the conduit 28 communicates with the port 39. A conduit 41 communicates with a sump or reservoir 42 and with the ports 36 and 38. A conduit 43 communicates with the port 37 and with a suitable source of fluid pressure such as the gear pump 44, said gear pump being provided with a supply conduit 45 connecting it with the reservoir 42.

The solid lines of Fig. 3 indicate the neutral position wherein no fluid can flow through the conduits 27 and 28, and consequently, the piston rods 21 and the tines 15 are locked against movement. When the valve stem 33 and the discs fixed thereto are moved to the dot and dash line position of Fig. 3, fluid under pressure flows from the pump 44, through the conduit 43, through the port 37, through the port 40, through the conduit 27, through the chamber 30, and through the conduits 24 into the upper ends of the cylinders 20, thereby causing extensible movement of the piston rods 21. During this movement, return fluid flows from the lower ends of the cylinders 20 back to the sump or reservoir 42, through the conduits 25, through the chamber 31, through the conduit 28, through the port 39, through the port 38, and through the conduit 41.

Retractive movement of the piston rods is effected by movement of the valve stem 33 and its discs to the dash line position of Fig. 3. In this position fluid under pressure flows in through the port 37, out of the port 39, and through the conduit 28, chamber 31, and conduits 25, to the lower ends of the cylinders 20. Return fluid flows back to the reservoir 42 through the conduits 24, chamber 30, conduit 27, port 40, port 36, and conduit 41.

In operation, the complete assembly shown in Figs. 1 and 2 is suspended from the U-shaped member 9 and is lowered over the material to be picked up while the tines 15 are opened to the position of Fig. 1. When the assembly is resting on the pile of material to be picked up, the stem 33 of the control valve 29 is moved to the dot and dash line position of Fig. 3 to cause extensible movement of the piston rods 21 and downwardly and inwardly swinging movement of the tines 15 toward the position of Fig. 2.

As the tines 15 swing downwardly and inwardly, they gather therebetween a quantity of the material to be picked up. All of the tines 15 are urged inwardly with the same amount of force, but they do not necessarily move inwardly the same distance, as is the case with conventional cable operated grapples. When some of the tines 15 encounter substantial resistance they stop moving inwardly, while the remainder of said tines continue to move inwardly until they encounter like resistance. This is possible because of the common connection of the conduits 24 with the conduit 27 in the chamber 30 of the manifold 26. This feature permits the improved grapple to carry increased amounts of material. When the tines 15 have suitably engaged the material, the stem 33 of the control valve 29 is moved to the full line position of Fig. 3 to lock the tines 15 in their position of engagement with the material embraced thereby.

The grapple assembly, with the engaged material, may then be raised and moved to a selected position. Upon reaching said point, the stem 33 of the control valve 29 is moved to the dash line position of Fig. 3 to cause retractive movement of the piston rods 21. This movement, in turn, causes the tines 15 to swing upwardly and outwardly toward the position of Fig. 1 to discharge the material therefrom. It will be noted that the shape of the tines 15 and the movement thereof is such that all material is discharged therefrom when the tines are in the position of Fig. 1, there being no places where material can become jammed or otherwise be held on the tines.

Various changes and modifications may be made without departing from the spirit of the invention, and all of such changes are contemplated as may come within the scope of the claims.

What I claim is:

1. In a grapple: a supporting frame; at least three arcuate tines pivotally connected to and positioned radially around the lower end of said frame for vertical swinging movement; and a separate hydraulic ram for each of said tines, each ram having a casing and piston rod connecting a tine to the frame; a source of fluid pressure; a manifold having a chamber communicating with said source; and conduits providing continuous fluid communication between the interiors of all of said ram casings and said manifold chamber.

2. In a grapple: a supporting frame, at least three arcuate tines pivotally connected to and positioned radially around the lower end of said supporting frame for vertical swinging movement; and a separate double acting hydraulic ram for each of said tines, each ram having a casing and piston rod connecting a tine to the frame; a manifold formed with two separate chambers; conduits providing continuous communication between corresponding ends of all of said casings and one of said manifold chambers; conduits providing continuous communication between the opposite ends of all of said casings and the other of said manifold chambers; a source of fluid pressure; and means including a control valve having an exhaust opening and being connected to said source of fluid pressure and to both of said manifold chambers for selectively introducing fluid under pressure into one of said chambers while permitting return fluid to be exhausted from the other of said chambers.

3. In a grapple: a vertically extending frame, at least three arcuate tines pivotally connected to and positioned radially around the lower end of said frame for vertical swinging movement; and a separate double acting hydraulic ram for each of said tines, each ram having a casing and piston rod connecting a tine to the frame; a supporting head connected to the upper end of said frame and having a hanger eye; a manifold positioned within said supporting head and formed with two separate chambers;

conduits connecting corresponding ends of all of said casings with one of said manifold chambers; conduits connecting the opposite ends of all of said casings with the other of said manifold chambers; a source of fluid pressure; and means including a control valve having an exhaust opening and being connected to said source of fluid pressure and to both of said manifold chambers for selectively introducing fluid under pressure into one of said chambers while permitting return fluid to be exhausted from the other of said chambers.

4. In a grapple having a supporting head: at least three arcuate tines pivotally connected to said supporting head for independent vertical swinging movement; a separate double acting hydraulic ram for each of said tines, each ram having a casing and piston rod connecting a tine to the frame; a manifold formed with two separate chambers; conduits connecting corresponding ends of all of said casings with one of said manifold chambers; conduits connecting the opposite ends of all of said casings with the other of said manifold casings; a source of fluid pressure; and means including a control valve having an exhaust opening and being connected to said source of fluid pressure and to both of said manifold chambers for selectively introducing fluid under pressure into one of said chambers while permitting return fluid to be exhausted from the other of said chambers.

5. In a grapple: a vertically extending frame; at least three tines pivotally connected to the lower end portion of said frame for independent vertical swinging movement; a separate hydraulic ram for each of said tines, each ram having a casing and piston rod connecting a tine to the frame; a supporting head connected to the upper end of said frame and having a hanger eye; a manifold within said supporting head having a chamber adapted to communicate with a source of fluid under pressure; and conduits providing fluid communication between the interiors of said ram casings and said manifold chamber.

6. In a grapple: a vertically extending tubular frame; at least three tines pivotally connected to the lower end portion of said frame for independent vertical swinging movement; a separate hydraulic ram for each of said tines; each ram having a casing and piston rod connecting a tine to the frame; a supporting head having an upstanding hanger eye and having a plurality of spaced depending legs fixed at their lower ends to the upper end of said tubular frame; a manifold positioned within said supporting head below said hanger eye and above said tubular frame, said manifold being adapted to be connected to a source of fluid under pressure; and conduits providing communication between said manifold and said ram casings.

7. In a grapple: a vertically extending frame; at least three tines pivotally connected to said supporting frame for independent vertical swinging movement; a separate double acting hydraulic ram for each of said tines, each ram having a casing and piston rod connecting a tine to the frame; a supporting head connected to the upper end of said frame and having a hanger eye; a manifold positioned within said supporting head and formed with two separate chambers; conduits providing continuous communication between corresponding ends of all of said casings and one of said manifold chambers; conduits providing continuous communication between the opposite ends of all of said casing and the other of said manifold chambers; a source of fluid under pressure; and means including a control valve having an exhaust opening and connected to said source of fluid pressure and to both of said manifold chambers for selectively introducing fluid under pressure into one of said chambers while permitting return fluid to be exhausted from the other of said chambers.

ROY O. BILLINGS.

References Cited in the file of this patent

UNITED STATES PATENTS

| Number | Name | Date |
| --- | --- | --- |
| 584,880 | Knox | June 22, 1897 |
| 1,307,009 | Joy | June 17, 1919 |
| 1,392,230 | Shade | Sept. 27, 1921 |
| 2,118,991 | Turechek et al. | May 31, 1938 |
| 2,478,034 | Zademach et al. | Aug. 2, 1949 |
| 2,491,806 | Frantz | Dec. 20, 1949 |